(No Model.)

L. L. BLACK.
MEAT TENDERER.

No. 559,838. Patented May 12, 1896.

WITNESSES, INVENTOR,
Charles T. Hannigan. Llewellyn L. Black
John E. Devour by James L. Jenks
Atty.

UNITED STATES PATENT OFFICE.

LLEWELLYN L. BLACK, OF REHOBOTH, MASSACHUSETTS.

MEAT-TENDERER.

SPECIFICATION forming part of Letters Patent No. 559,838, dated May 12, 1896.

Application filed December 19, 1895. Serial No. 572,639. (No model.)

*To all whom it may concern:*

Be it known that I, LLEWELLYN L. BLACK, a citizen of the United States, residing at Rehoboth, in the county of Bristol and State of Massachusetts, have invented certain new and useful Improvements in Meat-Tenderers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in meat-tenderers in which revolving cutters of suitable shape are mounted in a series and attached to a suitable handle; and the purpose of my invention is to provide a device for making meat tender by cutting and dividing the fibrous portions by means of passing the cutters to and fro across the meat. This object is accomplished by the device shown in the accompanying drawings, in which—

Figure 1:
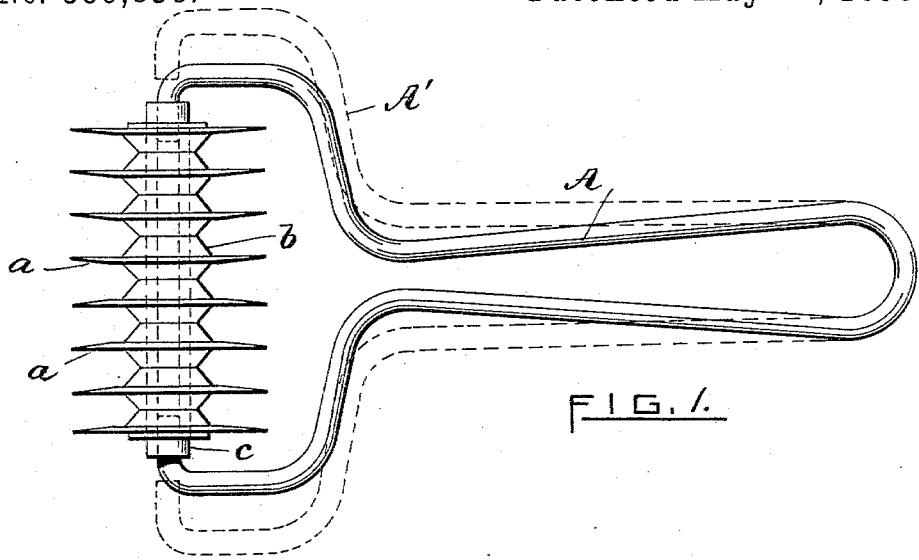

Figure 1 is a plan view, Fig. 2 a side view, and Figs. 3 and 4 details, of the invention to be described later.

The same letters refer to the same parts throughout.

In Fig. 1, $c$ is a shaft, upon which are mounted the star-shaped cutters $a\,a$, which are separated from each other by the washers $b$. The ends of the shaft $c$ are bored out for a short distance, as shown, to admit of the insertion of the extremities of the spring-wire handle A, which is detachable by simply springing it outward from the shaft $c$, as shown by the dotted lines A'. The star-shaped cutters $a$ are shown in detail in Figs. 3 and 4, and while a cutter of any desired number of points may be used I prefer the six-pointed shape shown as producing the best results.

Figures 3, 4:
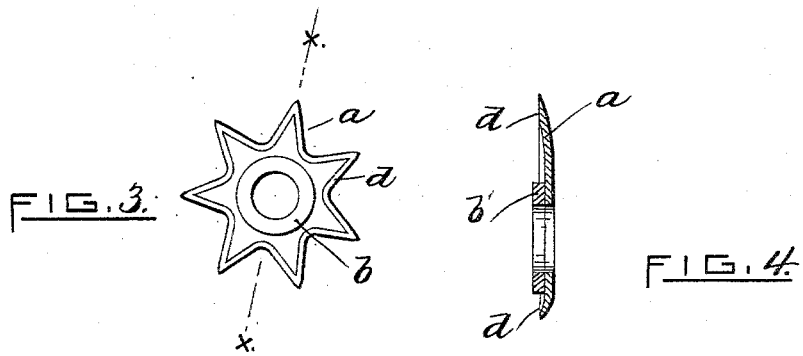

It will be seen from Fig. 4, which is a sectional view through $x\,x$ of Fig. 3, that the star-shaped cutter is slightly concave upon one side and beveled upon the other, the flat washer $b'$ in Fig. 4 being an outside washer which is put on the shaft after all the cutters are set thereon, the purpose of this washer being simply to hold the cutters in place.

The purpose of concaving the cutters on one side is to facilitate sharpening the same, all that is necessary being to place the cutter flat upon a slip-stone and move it back and forth a few times, the edge being thus perfectly restored.

Figure 2:
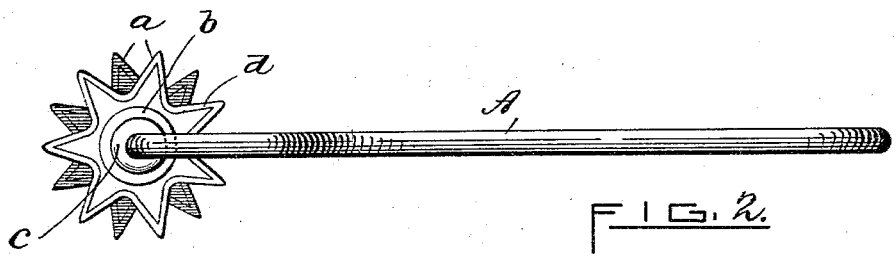

It will be noticed from Fig. 2 that the cutters are so placed upon the shaft $c$ as to leave them in a "staggered" form—*i. e.*, alternate cutters have their points in a line, while adjacent ones have their points opposite the depressions of their fellow. This arrangement is not essential, but is found to be the best way of arranging the cutters.

To operate my invention, it is only necessary to run the cutters firmly over the meat to be operated upon back and forth in different directions. This operation completely divides the fibers of the meat, separates the gristly portions into very fine particles, breaks up the sinewy parts, and renders otherwise tough meat very tender and easy of mastication. The ends of the handle A are so fitted to the shaft $c$ that the latter easily revolves with the cutters when the invention is in use.

Having now described my invention, what I claim, and desire to secure by Letters Patent, is—

In a meat-tenderer, a hollow shaft, and a spring-handle having its ends bent so as to catch in the ends of the shaft, combined with a series of disks secured to the shaft and provided with cutting-points, and made concave upon one side; and the washers $b$, $b'$, substantially as set forth.

In testimony whereof I affix my signature in presence of two witnesses.

LLEWELLYN L. BLACK.

Witnesses:
JOHN E. LE FAVOUR,
LELLAN J. TUCK.